(12) United States Patent
Matuszewski et al.

(10) Patent No.: US 11,513,337 B2
(45) Date of Patent: Nov. 29, 2022

(54) ELECTRICAL CONNECTIONS FOR SUPPLYING POWER TO INSULATING GLASS UNIT INTERIORS, AND/OR ASSOCIATED METHODS

(71) Applicant: GUARDIAN GLASS, LLC, Auburn Hills, MI (US)

(72) Inventors: John Matuszewski, Auburn Hills, MI (US); Lance Altizer, Auburn Hills, MI (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 252 days.

(21) Appl. No.: 16/947,006

(22) Filed: Jul. 15, 2020

(65) Prior Publication Data

US 2022/0019075 A1    Jan. 20, 2022

(51) Int. Cl.
*G02B 26/02*    (2006.01)

(52) U.S. Cl.
CPC .................................... *G02B 26/02* (2013.01)

(58) Field of Classification Search
CPC ...................................................... G02B 26/02
See application file for complete search history.

(56) References Cited

U.S. PATENT DOCUMENTS

| | | | |
|---|---|---|---|
| 6,887,575 B2 | 5/2005 | Neuman et al. | |
| 7,056,588 B2 | 6/2006 | Neuman et al. | |
| 7,189,458 B2 | 3/2007 | Ferreira et al. | |
| 7,198,851 B2 | 4/2007 | Lemmer et al. | |
| 7,645,977 B2 | 1/2010 | Schlam et al. | |
| 7,705,826 B2 | 4/2010 | Kalt et al. | |
| 7,771,830 B2 | 8/2010 | Neuman et al. | |
| 7,998,320 B2 | 8/2011 | Laird et al. | |
| 8,035,075 B2 | 10/2011 | Schlam et al. | |
| 8,134,112 B2 | 3/2012 | Schlam et al. | |

(Continued)

FOREIGN PATENT DOCUMENTS

| | | | |
|---|---|---|---|
| DE | 102006012433 A1 | 9/2007 | |
| WO | 02085806 A2 | 10/2002 | |

(Continued)

OTHER PUBLICATIONS

International Search Report and Written Opinion received for PCT Application No. PCT/IB2021/056378, dated Mar. 28, 2022, 15 pages.

*Primary Examiner* — Mary Ellen Bowman

(57) ABSTRACT

Certain example embodiments relate to an insulating glass (IG) unit. A spacer is interposed between first and second substrates. The spacer helps maintain the substrates in substantially parallel spaced apart relation to one another, and helps define a cavity therebetween. First and second exterior surfaces of the spacer face interior surfaces of the first and second substrates, respectively. Third and fourth exterior surface of the spacer face towards and away from the cavity, respectively. A membrane is provided over at least a part of the fourth exterior surface of the spacer. A pin protrudes through holes in the third and fourth exterior surfaces of the spacer, and through the membrane. The pin is formed from an electrically conducting material. A structural seal for the IG unit is provided external to the spacer and at least partially surrounds a portion of the pin that protrudes through the membrane.

33 Claims, 5 Drawing Sheets

(56) References Cited

U.S. PATENT DOCUMENTS

| | | | |
|---|---|---|---|
| 8,557,391 B2 | 10/2013 | Frank et al. | |
| 8,668,990 B2 | 3/2014 | Broadway et al. | |
| 8,736,938 B1* | 5/2014 | Schlam | E06B 9/264 |
| | | | 52/786.13 |
| 8,982,441 B2 | 3/2015 | Schlam et al. | |
| 9,556,066 B2 | 1/2017 | Frank et al. | |
| 9,670,092 B2 | 6/2017 | Lemmer et al. | |
| 9,695,085 B2 | 7/2017 | Lemmer et al. | |
| 9,796,619 B2 | 10/2017 | Broadway et al. | |
| 9,802,860 B2 | 10/2017 | Frank et al. | |
| 2007/0177391 A1* | 8/2007 | Davis | F21V 33/006 |
| | | | 362/145 |
| 2013/0319756 A1 | 12/2013 | Snyker et al. | |
| 2014/0272314 A1 | 9/2014 | Veerasamy | |
| 2015/0338713 A1* | 11/2015 | Brown | B32B 17/10513 |
| | | | 359/290 |
| 2020/0011120 A1 | 1/2020 | Blush et al. | |

FOREIGN PATENT DOCUMENTS

| | | |
|---|---|---|
| WO | 2013038409 A2 | 3/2013 |
| WO | 2020008435 A1 | 1/2020 |

* cited by examiner

ELECTRICAL CONNECTIONS FOR SUPPLYING POWER TO INSULATING GLASS UNIT INTERIORS, AND/OR ASSOCIATED METHODS

TECHNICAL FIELD

Certain example embodiments of this invention relate to techniques for supplying power to the interior cavities of insulating glass units (IG units or IGUs), and/or associated methods. For example, certain example embodiments of this invention relate to powering electric, potentially-driven shades and/or LED lights that may be used with IG units, IG units including such shades, and/or methods of making the same.

BACKGROUND AND SUMMARY

The building sector is known for its high energy consumption, which has been shown to represent 30-40% of the world's primary energy expenditure. Operational costs, such as heating, cooling, ventilation, and lighting account for the better part of this consumption, especially in older structures built under less stringent energy efficiency construction standards.

Windows, for example, provide natural light, fresh air, access, and connection to the outside world. However, they oftentimes also represent a significant source of wasted energy. With the growing trend in increasing the use of architectural windows, balancing the conflicting interests of energy efficiency and human comfort is becoming more and more important. Furthermore, concerns with global warming and carbon footprints are adding to the impetus for novel energy efficient glazing systems.

In this regard, because windows are usually the "weak link" in a building's isolation, and considering modern architectural designs that often include whole glass facades, it becomes apparent that having better insulating windows would be advantageous in terms of controlling and reducing energy waste. There are, therefore, significant advantages both environmentally and economically in developing highly insulating windows.

Insulating glass units (IG units or IGUs) have been developed and provide improved insulation to buildings and other structures, and FIG. 1 is a cross-sectional, schematic view of an example IG unit. In the FIG. 1 example IG unit, first and second substrates 102 and 104 are substantially parallel and spaced apart from one another. A spacer system 106 is provided at the periphery of the first and second substrates 102 and 104, helping to maintain them in substantially parallel spaced apart relation to one another and helping to define a gap or space 108 therebetween. The gap 108 may be at least partially filled with an inert gas (such as, for example, Ar, Kr, Xe, and/or the like) in some instances, e.g., to improve the insulating properties of the overall IG unit. Optional outer seals may be provided in addition to the spacer system 106 in some instances.

Windows are unique elements in most buildings in that they have the ability to "supply" energy to the building in the form of winter solar gain and daylight year around. Current window technology, however, often leads to excessive heating costs in winter, excessive cooling in summer, and often fails to capture the benefits of daylight, that would allow lights to be dimmed or turned off in much of the nation's commercial stock.

Thin film technology is one promising way of improving window performance. Thin films can, for example, be applied directly onto glass during production, on a polymer web that can be retrofitted to an already pre-existing window at correspondingly lower cost, etc. And advances have been made over the last two decades, primarily in reducing the U-value of windows through the use of static or "passive" low-emissivity (low-E) coatings, and by reducing the solar heat gain coefficient (SHGC) via the use of spectrally selective low-E coatings. Low-E coatings may, for example, be used in connection with IG units such as, for example, those shown in and described in connection with FIG. 1. However, further enhancements are still possible.

For instance, it will be appreciated that it would be desirable to provide a more dynamic IG unit option that takes into account the desire to provide improved insulation to buildings and the like, takes advantage of the ability of the sun to "supply" energy to its interior, and that also provides privacy in a more "on demand" manner. It will be appreciated that it would be desirable for such products to have a pleasing aesthetic appearance, as well.

Certain example embodiments address these and/or other concerns. For instance, certain example embodiments of this invention relate to electric, potentially-driven shades that may be used with IG units, IG units including such shades, and/or methods of making the same.

In certain example embodiments, an insulating glass (IG) unit is provided. First and second substrates are provided. A spacer is interposed between the first and second substrates, the spacer helping to maintain the first and second substrates in substantially parallel spaced apart relation to one another and to define a cavity therebetween, a first exterior surface of the spacer facing an interior surface of the first substrate, a second exterior surface of the spacer facing an interior surface of the second substrate, a third exterior surface of the spacer facing the cavity, and a fourth exterior surface of the spacer facing away from the cavity. A membrane is provided over at least a part of the fourth exterior surface of the spacer. A pin protrudes through holes in the third and fourth exterior surfaces of the spacer, and through the membrane, the pin being formed from an electrically conducting material. A structural seal for the IG unit is provided external to the spacer and at least partially surrounding a portion of the pin that protrudes through the membrane.

In certain example embodiments, a method of making an insulating glass (IG) unit is provided. The method comprises: having a spacer, the spacer including first, second, third, and fourth exterior surfaces; applying a membrane to the fourth exterior surface of the spacer; inserting a pin through the third and fourth exterior surfaces of the spacer, and through the membrane applied to the fourth exterior surface of the spacer, the pin including an electrically conductive material; sealing together first and second substrates with the spacer provided therebetween in making the IG unit, the first exterior surface of the spacer facing an inner surface of the first substrate, the second exterior surface of the spacer facing an inner surface of the second substrate, the third exterior surface of the spacer facing a cavity of the IG unit, and the fourth exterior surface of the spacer facing away from the cavity of the IG unit; and forming an outer structural seal for the IG unit using a structural sealant provided around an exterior of the spacer.

In certain example embodiments, an insulating glass (IG) unit is provided. First and second substrates each have interior and exterior major surfaces, the interior major surface of the first substrate facing the interior major surface of the second substrate. A spacer system helps to maintain the first and second substrates in substantially parallel spaced apart relation to one another and to define a gap therebetween. One or more lighting elements is/are provided in the gap. A dynamically controllable shade is interposed between the first and second substrates, the shade including: a first conductive layer provided, directly or indirectly, on the interior major surface of the first substrate; and a shutter including at least one polymer substrate, first and second conductive coatings, and first and second dielectric layers. The at least one polymer substrate is extendible to a shutter closed position and retractable to a shutter open position. The first and/or second conductive coatings are electrically connectable to a power source that is controllable to set up an electric potential difference to create first electrostatic forces to drive the at least one polymer substrate to the shutter closed position.

A method of making an IG unit according to the previous paragraph and the techniques set forth herein also are contemplated.

In certain example embodiments, a method of operating an electronic device located inside an IG unit is provided.

In certain example embodiments, a method of operating a dynamic shade in an insulating glass (IG) unit is provided. The method comprises having an IG unit made in accordance with the techniques disclosed herein; and selectively activating the power source to move the polymer substrate between the shutter open and closed positions.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Figure 1:
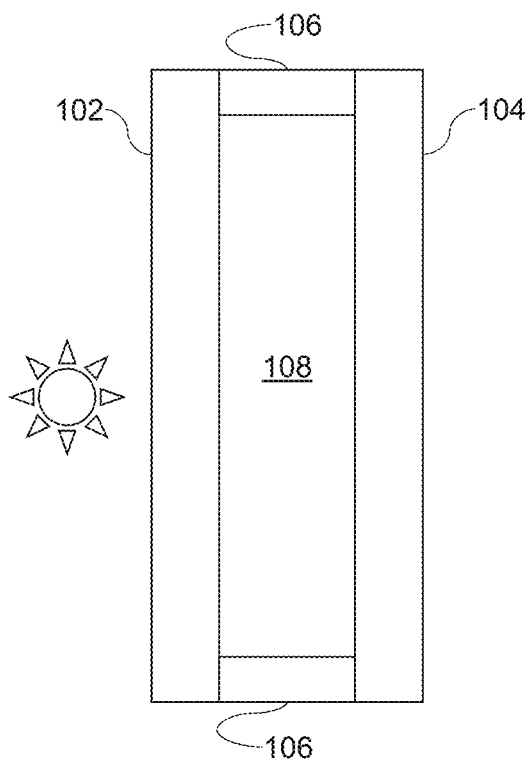
FIG. 1 is a cross-sectional, schematic view of an example insulating glass unit (IG unit or IGU)
Figure 2:
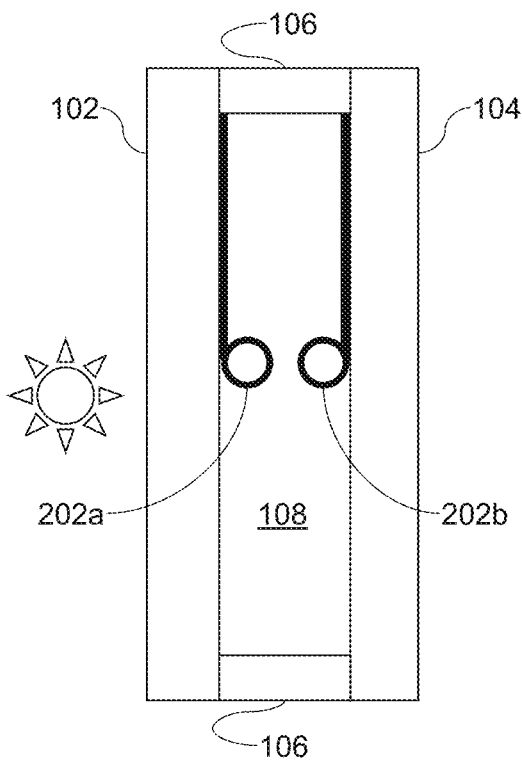
FIG. 2 is a cross-sectional, schematic view of an example IGU incorporating electric potentially-driven shades that may be used in connection with certain example embodiments.

Certain example embodiments of this invention relate to electric, potentially-driven shades that may be used with IG units, IG units including such shades, and/or methods of making the same. Referring now more particularly to the drawings, FIG. 2 is a cross-sectional, schematic view of an example insulating glass unit (IG unit or IGU) incorporating electric potentially-driven shades that may be used in connection with certain example embodiments. More specifically, FIG. 2 is similar to FIG. 1 in that first and second substantially parallel spaced apart glass substrates 102 and 104 are separated from one another using a spacer system 106, and a gap 108 is defined therebetween. First and second electric potentially-driven shades 202a and 202b are provided in the gap 108, proximate to inner major surfaces of the first and second substrates 102 and 104, respectively. As will become clearer from the description provided below, the shades 202a and 202b are controlled by the creation of an electric potential difference between the shades 202a and 202b, and conductive coatings formed on the inner surfaces of the substrates 102 and 104. As also will become clearer from the description provided below, each of shades 202a and 202b may be created using a polymer film coated with a conductive coating (e.g., a coating comprising a layer including Al, Cr, ITO, and/or the like). An aluminum-coated shade may provide for partial-to-complete reflection of visible light, and up to significant amounts of total solar energy.

The shades 202a and 202b are normally retracted (e.g., rolled up), but they rapidly extend (e.g., roll out) when an appropriate voltage is applied, in order to cover at least a portion of the substrates 102 and 104 much like, for example, a "traditional" window shade. The rolled-up shade may have a very small diameter, and typically will be much smaller than the width of the gap 108 between the first and second substrates 102 and 104, so that it can function between them and be essentially hidden from view when rolled up. The rolled-out shades 202a and 202b adhere strongly to the adjacent substrates 102 and 104.

The shades 202a and 202b extend along all or a portion of a vertical length of the visible or "framed" area of the substrates 102 and 104 from a retracted configuration to an extended configuration. In the retracted configuration, the shades 202a and 202b have a first surface area that substantially permits radiation transmission through the framed area. In the extended configuration, the shades 202a and 202b have a second surface area that substantially controls radiation transmission through the framed area. The shades 202a and 202b may have a width that extends across all or a portion of the horizontal width of the framed area of the substrates 102 and 104 to which they are attached.

Each of the shades 202a and 202b is disposed between the first and second substrates 102 and 104, and each preferably is attached at one end to an inner surface thereof (or a dielectric or other layer disposed thereon), near the tops thereof. An adhesive layer may be used in this regard. The shades 202 and 204 are shown partially rolled out (partially extended) in FIG. 2. The shades 202a and 202b and any adhesive layer or other mounting structure preferably are hidden from view so that the shades 202a and 202b are only seen when at least partially rolled out.

The diameter of a fully rolled-up shade preferably is about 1-5 mm but may be greater than 5 mm in certain example embodiments. Preferably, the diameter of a rolled-up shade is no greater than the width of the gap 108, which is typically about 10-15 mm, in order to help facilitate rapid and repeated roll-out and roll-up operations. Although two shades 202a and 202b are shown in the FIG. 2 example, it will be appreciated that only one shade may be provided in certain example embodiments, and it also will be appreciated that that one shade may be provided on an inner surface of either the inner or outer substrate 102 or 104. In example embodiments where there are two shades, the combined diameter thereof preferably is no greater than the width of the gap 108, e.g., to facilitate roll-out and roll-up operations of both shades.

An electronic controller may be provided to help drive the shades 202a and 202b. The electronic controller may be electrically connected to the shades 202a and 202b, as well as the substrates 102 and 104, e.g., via suitable leads or the like. The leads may be obscured from view through the assembled IG unit. The electronic controller is configured to provide an output voltage to the shades 202a and 202b. Output voltage in the range of about 100-800 V DC (e.g., 100-500 V DC or 300-800 V DC) can be used for driving the shades 202a and 202b in certain example embodiments. An external AC or DC power supply, a DC battery, and/or the like may be used in this regard. It will be appreciated that higher or lower output voltage may be provided, e.g., depending on the fabrication parameters and materials that comprise the shades 202a and 202b, the layers on the substrates 102 and 104, etc.

The controller may be coupled to a manual switch, remote (e.g., wireless) control, or other input device, e.g., to indicate whether the shades 202a and 202b should be retracted or extended. In certain example embodiments, the electronic controller may include a processor operably coupled to a memory storing instructions for receiving and decoding control signals that, in turn, cause voltage to be selectively applied to control the extension and/or retraction of the shades 202a and 202b. Further instructions may be provided so that other functionality may be realized. For instance, a timer may be provided so that the shades 202a and 202b can be programmed to extend and retract at user-specified or other times, a temperature sensor may be provided so that the shades 202a and 202b can be programmed to extend and retract if user-specified indoor and/or outdoor temperatures are reached, light sensors may be provided so that the shades 202a and 202b can be programmed to extend and retract based on the amount of light outside of the structure, etc.

Although two shades 202a and 202b are shown in FIG. 2, as noted above, certain example embodiments may incorporate only a single shade. Furthermore, as noted above, such shades may be designed to extend vertically and horizontally along and across substantially the entire IG unit, different example embodiments may involve shades that cover only portions of the IG units in which they are disposed. In such cases, multiple shades may be provided to deliver more selectable coverage, to account for internal or external structures such as muntin bars, to simulate plantation shutters, etc.

In certain example embodiments, a locking restraint may be disposed at the bottom of the IGU, e.g., along its width, to help prevent the shades from rolling out their entire lengths. The locking restraint may be made from a conductive material, such as a metal or the like. The locking restraint also may be coated with a low dissipation factor polymer such as, for example, polypropylene, fluorinated ethylene propylene (FEP), polytetrafluoroethylene (PTFE), and/or the like.

Figure 3:
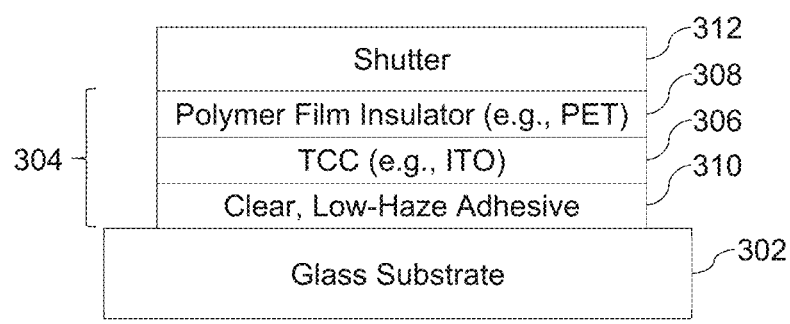
FIG. 3 is a cross-sectional view showing example on-glass components from the FIG. 2 example IGU that enable shutter action, in accordance with certain example embodiments.
Figure 4:
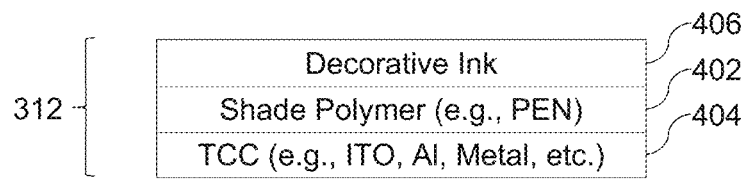
FIG. 4 is a cross-sectional view of an example shutter from the FIG. 2 example IGU, in accordance with certain example embodiments.

Example details of the operation of the shades 202a and 202b will now be provided in connection with FIGS. 3-4. More particularly, FIG. 3 is a cross-sectional view showing example on-glass" components from the FIG. 2 example IGU that enable shutter action, in accordance with certain example embodiments; and FIG. 4 is a cross-sectional view of an example shutter from the FIG. 2 example IGU, in accordance with certain example embodiments. FIG. 3 shows a glass substrate 302, which may be used for either or both of the substrates 102 and 104 in FIG. 2. The glass substrate 302 supports on-glass components 304, as well as the shutter 312. In certain example embodiments, when unrolled, the conductor 404 may be closer to the substrate 302 than the ink layer 406. In other example embodiments, this arrangement may be reversed such that, for example, when unrolled, the conductor 404 may be farther from the substrate 302 than the ink layer 406.

The on-glass components 304 include a transparent conductor 306, along with a dielectric material 308, which may be adhered to the substrate 302 via a clear, low-haze adhesive 310 or the like. These materials preferably are substantially transparent. In certain example embodiments, the transparent conductor 306 is electrically connected via a terminal to a lead to the controller. In certain example embodiments, the transparent conductor 306 serves as a fixed electrode of a capacitor, and the dielectric material 308 serves as the dielectric of this capacitor. In such cases, a dielectric or insulator film is provided, directly or indirectly, on the first conductive layer, with the dielectric or insulator film being separate from the shutter.

It will be appreciated that it is possible to put all of the dielectric layers on the shade in certain example embodiments, thereby exposing a bare conductive (flat) substrate, e.g., a glass substrate supporting a conductive coating. For example, in certain example embodiments, the polymer film insulator 308 may be provided on/integrated as a part of the shutter 312, rather than being provided on/integrated as a part of the substrate 302. That is, the shutter 312 may further support a dielectric or insulator film 308 thereon such that, when the at least one polymer substrate is in the shutter closed position and the shutter is extended, the dielectric or insulator film directly physically contacts the first conductive layer with no other layers therebetween.

The transparent conductor 306 may be formed from any suitable material such as, for example, ITO, tin oxide (e.g., $SnO_2$ or other suitable stoichiometry), etc. The transparent conductor 306 may be 10-500 nm thick in certain example embodiments. The dielectric material 308 may be a low dissipation factor polymer in certain example embodiments. Suitable materials include, for example, polypropylene, FEP, PTFE, polyethyleneterephthalate (PET), polyimide (PI), and polyethylenenapthalate (PEN), etc. The dielectric material 308 may have a thickness of 4-25 microns in certain example embodiments. The thickness of the dielectric material 308 may be selected so as to balance reliability of the shade with the amount of voltage (e.g., as thinner dielectric layers typically reduce reliability, whereas thicker dielectric layers typically require a high applied voltage for operational purposes).

As is known, many low-emissivity (low-E) coatings are conductive. Thus, in certain example embodiments, a low-E coating may be used in place of the transparent conductor 306 in certain example embodiments. The low-E coating may be a silver-based low-E coating, e.g., where one, two, three, or more layers comprising Ag may be sandwiched between dielectric layers. In such cases, the need for the adhesive 310 may be reduced or completely eliminated.

The shutter 312 may include a resilient layer 402. In certain example embodiments, a conductor 404 may be used on one side of the resilient layer 402, and a decorative ink 406 optionally may be applied to the other side. In certain example embodiments, the conductor 404 may be transparent and, as indicated, the decorative ink 406 is optional. In certain example embodiments, the conductor 404 and/or the decorative ink 406 may be translucent or otherwise impart coloration or aesthetic features to the shutter 312. In certain example embodiments, the resilient layer 402 may be formed from a shrinkable polymer such as, for example, PEN, PET, polyphenylene sulfide (PPS), polyether ether ketone (PEEK), etc. The resilient layer 402 may be 1-25 microns thick in certain example embodiments. The conductor 404 may be formed from the same or different material as that used for conductor 306, in different example embodiments. Metal or metal oxide materials may be used, for example. In certain example embodiments, a 10-50 nm thick material including a layer comprising, for example, ITO, Al, Ni, NiCr, tin oxide, and/or the like, may be used. In certain example embodiments, the resistance of the conductor 404 may be in the range of 40-200 ohms/square.

The decorative ink 406 may include pigments, particles, and/or other materials that selectively reflect and/or absorb desired visible colors and/or infrared radiation.

As FIG. 2 shows, the shades 202a and 202b ordinarily are coiled as spiral rolls, with an outer end of the spiral affixed by an adhesive to the substrates 102 and 104 (e.g., or the dielectric thereon). The conductor 404 may be electrically connected via a terminal to a lead or the like and may serve as a variable electrode of a capacitor having the conductor 306 as its fixed electrode and the dielectric 308 as its dielectric.

When an electrical drive is provided between the variable electrode and the fixed electrode, e.g., when an electric drive of voltage or current is applied between the conductor 404 of the shutter 312 and the conductor 306 on the substrate 302, the shutter 312 is pulled toward the substrate 302 via an electrostatic force created by the potential difference between the two electrodes. The pull on the variable electrode causes the coiled shade to roll out. The electrostatic force on the variable electrode causes the shutter 312 to be held securely against the fixed electrode of the substrate 302. As a result, the ink coating layer 406 of the shade selectively reflects or absorbs certain visible colors and/or infrared radiation. In this way, the rolled-out shade helps control radiation transmission by selectively blocking and/or reflecting certain light or other radiation from passing through the IG unit, and thereby changes the overall function of the IG unit from being transmissive to being partially or selectively transmissive, or even opaque in some instances.

When the electrical drive between the variable electrode and the fixed electrode is removed, the electrostatic force on the variable electrode is likewise removed. The spring constant present in the resilient layer 402 and the conductor 404 causes the shade to roll up back to its original, tightly-wound position. Because movement of the shade is controlled by a primarily capacitive circuit, current essentially only flows while the shade is either rolling out or rolling up. As a result, the average power consumption of the shade is extremely low. In this way, several standard AA batteries may be used to operate the shade for years, at least in some instances.

In one example, the substrate 302 may be 3 mm thick clear glass commercially available from the assignee. An acrylic-based adhesive having a low haze may be used for adhesive layer 310. Sputtered ITO having a resistance of 100-300 ohms/square may be used for the conductor 306. The polymer film may be a low-haze (e.g., <1% haze) PET material that is 12 microns thick. A PVC-based ink available from Sun Chemical Inc. applied to 3-8 microns thickness may be used as the decorative ink 406. A PEN material commercially available from DuPont that is 6, 12, or 25 microns thick may be used as the resilient layer 402. For an opaque conductor 406, evaporated Al that has a nominal thickness of 375 nm may be used. For a transparent option, sputtered ITO may be used. In both cases, the resistance may be 100-400 ohms/square. The ITO or other conductive material(s) may be sputtered onto, or otherwise formed on, their respective polymer carrier layers in certain example embodiments. Of course, these example materials, thicknesses, electrical properties, and their various combinations and sub-combinations, etc., should not be deemed limiting unless specifically claimed.

As will be appreciated from the description above, the dynamic shade mechanism uses a coiled polymer with a conductive layer. In certain example embodiments, the conductor 402 may be formed to be integral with the polymer 402, or it may be an extrinsic coating that is applied, deposited, or otherwise formed on the polymer 402. As also mentioned above, decorative ink 406 may be used together with a transparent conductor material (e.g., based on ITO) and/or an only partially transparent or opaque conductive layer. An opaque or only partially transparent conductive layer may obviate the need for ink in certain example embodiments. In this regard, a metal or substantially metallic material may be used in certain example embodiments. Aluminum is one example material that may be used with or without a decorative ink.

One or more overcoat layers may be provided on the conductor to help reduce the visible light reflection and/or change the color of the shade to provide a more aesthetically pleasing product, and/or by "splitting" the conductor so that a phase shifter layer appears therebetween. Overcoats thus may be included to improve the aesthetic appearance of the overall shade. The shutter 312 thus may include a reflection-reducing overcoat, dielectric mirror overcoat, or the like. Such reflection-reducing overcoats and dielectric mirror overcoats may be provided over a conductor 404 and on a major surface of the shade polymer 402 comprising (for example) PEN opposite decorative ink 406. It will be appreciated, however, that the ink 406 need not be provided, e.g., if the conductor 404 is not transparent. Mirror coatings such as, for example, Al, may obviate the need for decorative ink 406. It also will be appreciated that the reflection-reducing overcoat and the dielectric mirror overcoat may be provided on major surfaces of the shade polymer 402 comprising (for example) PEN opposite the conductor 404 in certain example embodiments.

In addition to or in place of using optical interference techniques to reduce reflection, it also is possible to add a textured surface to the base polymer, modifying the conductive layer chemically or physically, and/or add an ink layer, e.g., to accomplish the same or similar ends, achieve further reductions in unwanted reflection, etc.

Given that the thin film and/or other materials comprising the shutter should survive numerous rolling and unrolling operations in accordance with the functioning of the overall shade, it will be appreciated that the materials may be selected, and that the overall layer stack formed, to have mechanical and/or other properties that facilitate the same. For example, an excess of stress in a thin film layer stack typically is seen as disadvantageous. However, in some instances, excess stress can lead to cracking, "delamination"/removal, and/or other damage to the conductor 404 and/or an overcoat layer or layers formed thereon. Thus, low stress (and in particular low tensile stress) may be particularly desirable in connection with the layer(s) formed on the shutters' polymer bases in certain example embodiments.

In this regard, the adhesion of sputtered thin films depends on, among other things, the stress in the depositing film. One way stress can be adjusted is with deposition pressure. Stress versus sputter pressure does not follow a monotonic curve but instead inflects at a transition pressure that in essence is unique for each material and is a function of the ratio of the material's melting temperature to the substrate temperature. Stress engineering can be accomplished via gas pressure optimizations, bearing these guideposts in mind.

Other physical and mechanical properties of the shade that may be taken into account include the elastic modulus of the polymer and the layers formed thereon, the density ratio of the layers (which may have an effect on stress/strain), etc. These properties may be balanced with their effects on internal reflection, conductivity, and/or the like.

As is known, temperatures internal to an IG unit may become quite elevated. For example, it has been observed that an IG unit in accordance with the FIG. 2 example and including a black pigment may reach a temperature of 87 degrees C., e.g., if the black portion of the shade is facing the sun in elevated temperature, high solar radiation climates (such as, for example, in areas of the southwest United States such as Arizona). The use of a PEN material for the rollable/unrollable polymer may be advantageous, as PEN has a higher glass transition temperature (~120 degrees C.), compared to other common polymers such as PET (Tg=67-81 degrees C.), Poly Propylene or PP (Tg=~32 degrees C.). Yet if the PEN is exposed to temperatures approaching the glass transition temperature, the performance of the material's otherwise advantageous mechanical properties (including its elastic modulus, yield strength, tensile strength, stress relaxation modulus, etc.) may degrade overtime, especially with elevated temperature exposure. If these mechanical properties degrade significantly, the shade may no longer function (e.g., the shade will not retract).

In order to help the shade better withstand elevated temperature environments, a substitution from PEN to polymers with better elevated temperature resistance may be advantageous. Two potential polymers include PEEK and Polyimide (PI or Kapton). PEEK has a Tg of ~142 degrees C. and Kapton HN has a Tg of ~380 degrees C. Both of these materials have better mechanical properties in elevated temperature environments, compared to PEN. This is especially true at temperature above 100 degrees C. The following chart demonstrates this, referencing mechanical properties of PEN (Teonex), PEEK, and PI (Kapton HN). UTS stands for ultimate tensile strength, in the chart.

|  |  | PEN | PEEK | PI |
| --- | --- | --- | --- | --- |
| 25 degrees C. | UTS (psi) | 39,000 | 16,000 | 33,500 |
|  | Modulus (psi) | 880,000 | 520,000 | 370,000 |
|  | Yield (psi) | 17,500 |  | 10,000 |
| 200 degrees C. | UTS (psi) | 13,000 | 8,000 | 20,000 |
|  | Modulus (psi) |  |  | 290,000 |
|  | Yield (psi) | <1,000 |  | 6,000 |
| Tg |  | ~121 degrees C. | ~143 degrees C. | ~380 degrees C. |

It will be appreciated that the modification of the shade base material from its current material (PEN) to an alternate polymer (e.g., PEEK or PI/Kapton) that has increased elevated temperature mechanical properties may be advantageous in the sense that it may enable the shade to better withstand internal IG temperatures, especially if the shade is installed in higher temperature climates. It will be appreciated that the use of an alternative polymer may be used in connection with the shutter and/or the on-glass layer in certain example embodiments.

In addition, or as an alternative, certain example embodiments may use a dyed polymer material. For example, a dyed PEN, PEEK, PI/Kapton, or other polymer may be used to created shades with an assortment of colors and/or aesthetics. For instance, dyed polymers may be advantageous for embodiments in transparent/translucent applications, e.g., where the shade conductive layer is a transparent conductive coating or the like.

Alternate conductive materials that beneficially modify the spring force of the coiled shade to make it usable for various lengths may be used. In this regard, properties of the conductive layer that increase the strength of the coil include an increase in the elastic modulus, an increase in the difference in coefficient of thermal expansion (CTE) between the polymer substrate and the conductive layer, and an increase in the elastic modulus to density ratio. Some of the pure metals that can be used to increase coil strength compared to Al or Cr include Ni, W, Mo, Ti, and Ta. The elastic modulus of studied metal layers ranged from 70 GPa for Al to 330 GPa for Mo. The CTE of studied metal layers ranged from $23.5 \times 10^{-6}$/k for Al down to $4.8 \times 10^{-6}$/k for Mo. In general, the higher the elastic modulus, the higher the CTE mismatch between the PEN or other polymer and the metal, the lower the density, etc., the better the material selection in terms of coil formation. It has been found that incorporating Mo and Ti based conductive layers into shades has resulted in a spring force of the coil that is significantly higher than that which is achievable with Al. For example, a polymer substrate based on PEN, PEEK, PI, or the like, may support (in order moving away from the substrate) a layer comprising Al followed by a layer comprising Mo. Thin film layer(s) in a conductive coating and/or a conductive coating itself with a greater modulus and lower CTE than Al may be provided.

A PEN, PI, or other polymer substrate used as a shutter may support a thin layer comprising Al for stress-engineering purposes, with a conductive layer comprising Mo, Ti, or the like directly or indirectly thereon. The conductive layer may support a corrosion-resistant layer comprising Al, Ti, stainless steel, or the like. The side of the substrate opposite these layers optionally may support a decorative ink or the like.

Certain example embodiments may include microscopic perforations or through-holes that allow light to pass through the shade and provide progressive amounts of solar transmittance based on the angle of the sun.

Further manufacturing, operation, and/or other details and alternatives may be implemented. See, for example, U.S. Pat. Nos. 8,982,441; 8,736,938; 8,134,112; 8,035,075; 7,705,826; and 7,645,977, as well as U.S. Publication No. 2020/0011120; the entire contents of each of which is hereby incorporated herein by reference. Among other things, perforation configurations, polymer materials, conductive coating designs, stress engineering concepts, building-integrated photovoltaic (BIPV), and other details are disclosed therein and at least those teachings may be incorporated into certain example embodiments.

It will be appreciated by those skilled in the IG unit related arts, one issue associated with the dynamic shade design relates to providing electrical power to the interior cavity of an IG unit. For example, an electric, potential-driven dynamic shade will need to be powered in order to operate. To do so, power can be transferred from outside the IG unit to inside the IG unit. Passing under or over the spacer is possible, but doing so could present challenges. For example, frit-related processes may become complicated because the spacers typically are conductive. Application of conductive and/or insulating frit also can be complicated if the spacer is applied beforehand, because the spacer must securely seal the IG unit together and reduce the risk of outgassing, etc. Inductive power transfer techniques at this time are not suitable, e.g., because of the relative cost and complication of such systems, etc. And simply poking a hole through the spacer and putting a wire through presents numerous leak points that can drastically shorten the lifetime of an IG unit, e.g., because the leak points can promote outgassing of the inert gas (typically, Ar, Kr, Xe, and/or other noble gas alone or mixed with air in a predetermined percentage such as, for example, 80% Ar and 20% oxygen), ingress of moisture, etc.

Certain example embodiments help address these and/or other concerns. For instance, certain example embodiments relate to techniques for providing power to the interior of the cavity of IG units and/or associated methods. The techniques provided herein advantageously reduce the likelihood of leak points being created and/or forming over time, and the connection approaches result in longer lifetimes for the IG units compared to other approaches because of the reduced risk of outgassing, ingress of moisture, etc. Advantageously, the techniques described herein can be used to provide power to IG unit cavity interiors for use in a variety of applications including, for example, applications where power is used to drive dynamic shades, activate lights, power sensors, extract power from photovoltaic (PV) cells, and/or the like.

As will become clearer from the description below, certain example embodiment use a specialized pin to puncture the spacer and provide for electrical connection. Prior to insertion, the spacer is prepared by placing a pad at the puncture site. The pad may be, for example, a polyisobutylene (PIB) or otherwise lined rubber pad placed at the puncture site. This two-part seal is desirable, as the first part (the PIB material) provides a gas seal, while the second part (the rubber) acts as a septum and further seals against the pin. A barrel or other connector is placed on the end of the pin to provide power.

Figure 5:
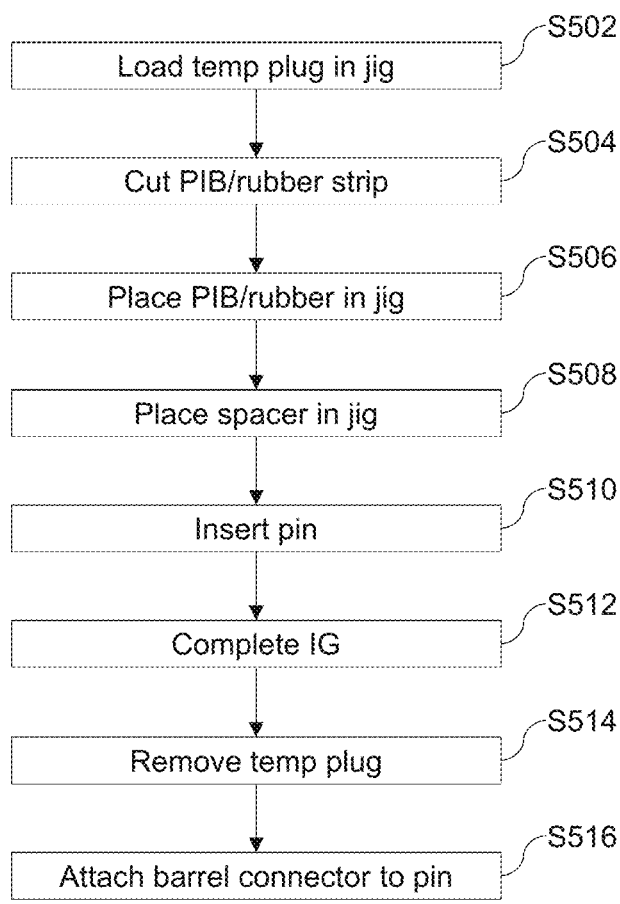
FIG. 5 is a flowchart with an example process for forming an electrical connection for providing power to the interior of an IG unit cavity, in accordance with certain example embodiments.

FIG. 5 is a flowchart with an example process for forming an electrical connection for providing power to the interior of an IG unit cavity, in accordance with certain example embodiments. In step S502, a temporary cap/plug is loaded into a jig. The two-part seal is placed in the jig. This may include, for example, manufacturing the two-part seal as noted in step S504, e.g., by securing the PIB to the rubber, and cutting the PIB-lined rubber to size. The PIB/rubber piece then may be placed into the jig as in step S506. In step S508, the spacer is placed into the jig. The spacer may be formed before being placed into the jig or while it is held in the jig. For example, in certain example embodiments, the spacer may be cut to length, filled with desiccant, have its ends plugged with corner keys, and then be placed into the jig. Optionally, a metal bar facilitating an internal electrical connection is placed on the spacer, in the fixture, so as to correspond with an internal area of the IG unit cavity. In step S510, the pin is driven through the assembly comprising the optional metal bar and spacer, and into the temporary cap/plug.

The IG unit is built as is convention in step S512. This includes placing the first and second substrates in substantially parallel spaced apart relation to one another, sealing them together using the spacer (e.g., using a PIB or other sealant provided between the spacer and the respective substrates), and applying a structural sealant (e.g., of or including silicone). The structural sealant is applied over temporary cap/plug in certain example embodiments. The IG unit cavity may be backfilled with the inert gas or inert gas mixture, also as is conventional. In step S514, the temporary cap/plug is removed, leaving a small cavity. In step S516, the barrel or other connector is placed onto the pin, providing an electrical connection and means by which to supply power to the IG unit cavity interior. It is noted that the timing of the removal of the temporary cap/plug and/or the attachment of the barrel or other connector may be critical. For instance, this may be accomplished at a time where the structural sealant is not yet fully hardened so as to allow for temporary cap/plug removal and subsequent connector insertion while still allowing a good seal to be formed. Similarly, this may be accomplished so as to reduce the likelihood of outgassing of the backfilled inert gas/insert gas mixture, in certain example embodiments.

Figure 6:
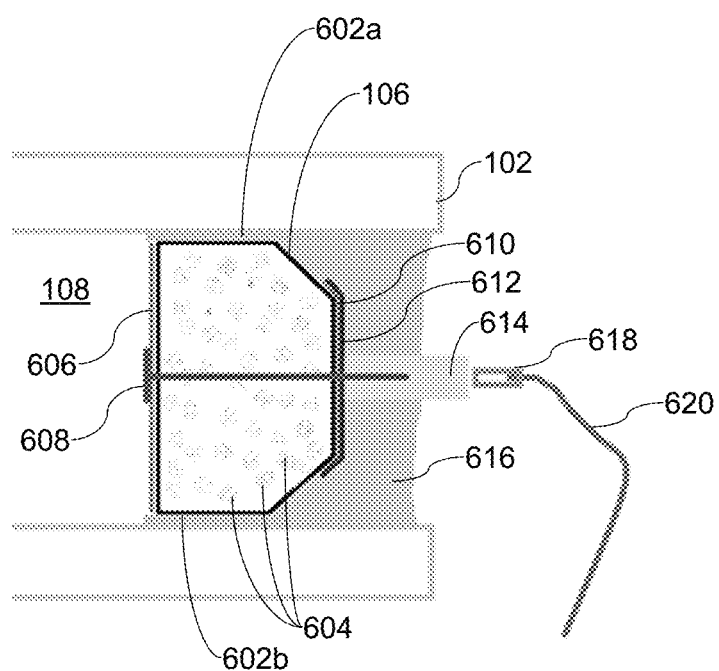
FIG. 6 is a schematic, cross-sectional view showing how an electrical connection can be used to provide power to the interior of an IG unit cavity, in accordance with certain example embodiments.

FIG. 6 is a schematic, cross-sectional view showing how an electrical connection can be used to provide power to the interior of an IG unit cavity, in accordance with certain example embodiments. The FIG. 6 example schematic can be made using the FIG. 5 example technique. As shown in FIG. 6, the first and second substrates 102 and 104 are separated by the spacer 106. Sealant 602*a* helps seal the spacer 106 to the first substrate 102, and sealant 602*b* helps seal the spacer 106 to the second substrate 104. The spacer 106 is provided around peripheral edges of the first and second substrates 102 and 104, which may have the same or different sizes. PIB may be used for the sealant 602*a*, 602*b* in certain example embodiments. Within the body of the spacer 106 is desiccant 604, which helps mitigate issues associated with the potential ingress of moisture into the cavity 108. Generally, the spacer 106 will be an enclosed, solid structure capable of "storing" therein beads of desiccant 604 or the like. The spacer 106 may have any suitable profile including, for example, a generally rectangular cross-sectional profile, a generally rectangular cross-sectional profile with chamfered corners proximate to the exterior of the IG unit as shown in FIG. 6, and/or the like. Any suitable spacer system may be used. This includes, for example, SWISSPACER spacer systems, IET spacers, and/or the like. In certain example embodiments, the spacer 106 itself may be non-conducting. Metal (e.g., aluminum), plastic, or other materials can be used for the spacer 106 in different example embodiments.

The optional conductive plate 606 may be formed from metal or another conductive material. Having the conductive plate 606 interior to at least a portion of spacer 106 can be useful for easily forming electrical connection with components to be powered. That is, the conductive plate 606 may provide a large surface area to form electrical contact, and that area may be significantly larger than the nail or pin 608, which provides power through the spacer 106 itself. (For the purpose of this disclosure, it is understood that there is no difference between a nail or pin.) Because the interior of the IG unit may be harder to service or connect to than the exterior, the head of the nail or pin 608 may be provided to the interior surface of the spacer 106 adjacent to the cavity 108. The conductive plate 606 in this sense may function as a bus bar or the like. The nail or pin 608 may be coated or covered along its length and around the portion of its head contacting the bus bar so as to prevent electrical connection with the spacer 106 itself. Electrically insulating material may be provided around the nail in portions that otherwise would come into contact with the spacer 106. This may be desirable when the spacer 106 is formed from a conductive material. Thus, in certain example embodiments, portions of the pin that contact the spacer may be insulated so as to avoid electrical contact between the pin and the spacer.

With a dynamic shade, the conductive plate 606 may be provided at an end stop, top stop, and/or the like. When other electrical components are provided within the cavity 108, a single conductive plate 606 may be used, or multiple plates may be provided. The latter might be advantageous where different components are to be powered using connections at different places. For instance, a dynamic shade may be powered at a top or end stop close to the top or bottom of the shade, whereas LED lights provided at the bottom or top of the shade may benefit from a separate plate provided more at a more proximate location.

As noted above, the head of the nail or pin 608 is provided for the interior of the IG unit in the cavity 108. The end of the nail extends through the spacer 106 and protrudes outwardly therefrom. In FIG. 6, for example, the end of the nail or pin 608 protrudes through the two-part seal which includes a first part 610 and a second part 612. This may include an inner PIB lining (first part 610) for an outer piece of rubber (second part 612). The nail or pin 608 is at least temporarily protected by a cap or plug 614. This cap or plug 614 may help protect the nail or pin 608 during IG unit fabrication operations, storage and/or transportation, etc. For instance, the cap or plug 614 may protect the nail or pin 608 during formation of the structural seal, which may be formed from silicone or the like.

In certain example embodiments, the cap or plug 614 may be formed from a flexible silicon or Teflon material. In certain example embodiments, the cap or plug 614 may be more permanent and may be hollow so that a barrel or other connector 618 may provide connection to the external wire 620, which may provide power or the like to the interior of the IG unit. In the FIG. 6 example, the barrel or other connector 618 is shown disconnected from the nail or pin 608, so that there is no electrical contact between the wire 620. However, this is done for explanatory purposes only, and a functioning/installed embodiment will involve an electrical contact and connection. In certain example embodiments, the connector is located within the IG unit and is at least partially surrounded by the structural seal.

A wire could be used instead of the nail or pin 608. However, the use of the nail or pin 608 may be advantageous for several reasons. For example, the rubber/PIB piece provides a seal for the nail or pin 608, and it is easier to seal a rigid component in place compared to a more flexible wire. Additionally, the nail or pin 608 is a rigid structure and helps secure the components in place. That is, the nail or pin 608 helps secure the optional plate 606, inner PIB lining (first part 610), and outer piece of rubber (second part 612) to the spacer 106. Because of this secure attachment, there is less likelihood of disconnection that might occur with a wire, e.g., from transportation, storage, installation, and/or other procedures.

The advantages to this system, aside from the power transmission, relates to an easily manufacturing process that accommodates existing spacer systems. The two-part seal PIB/rubber functions as a membrane and can be placed manually at any time, or its placement can be automated using robots. The pin can be inserted at any time (e.g., prior to the IG unit being sealed) with a specialized fixture and pneumatic actuator, either manually or via a robot. A temporary rubber that the pin also penetrates allows normal silicone application without the mess of wires. The temporary rubber can be removed for easy and clean access to the pin. Thus, an impermeable barrier is created in certain example embodiments, providing protection against moisture ingress into the cavity and inert gas egress from the cavity, while still providing a secure and reliable way to provide electrical power to the interior of the cavity.

Although certain example embodiments have been described as providing approaches to providing power to the interior of an IG unit cavity, it will be appreciated that the conductive nail or pin may be used to transmit data into or out of the IG unit cavity in certain example embodiments.

Figure 7:
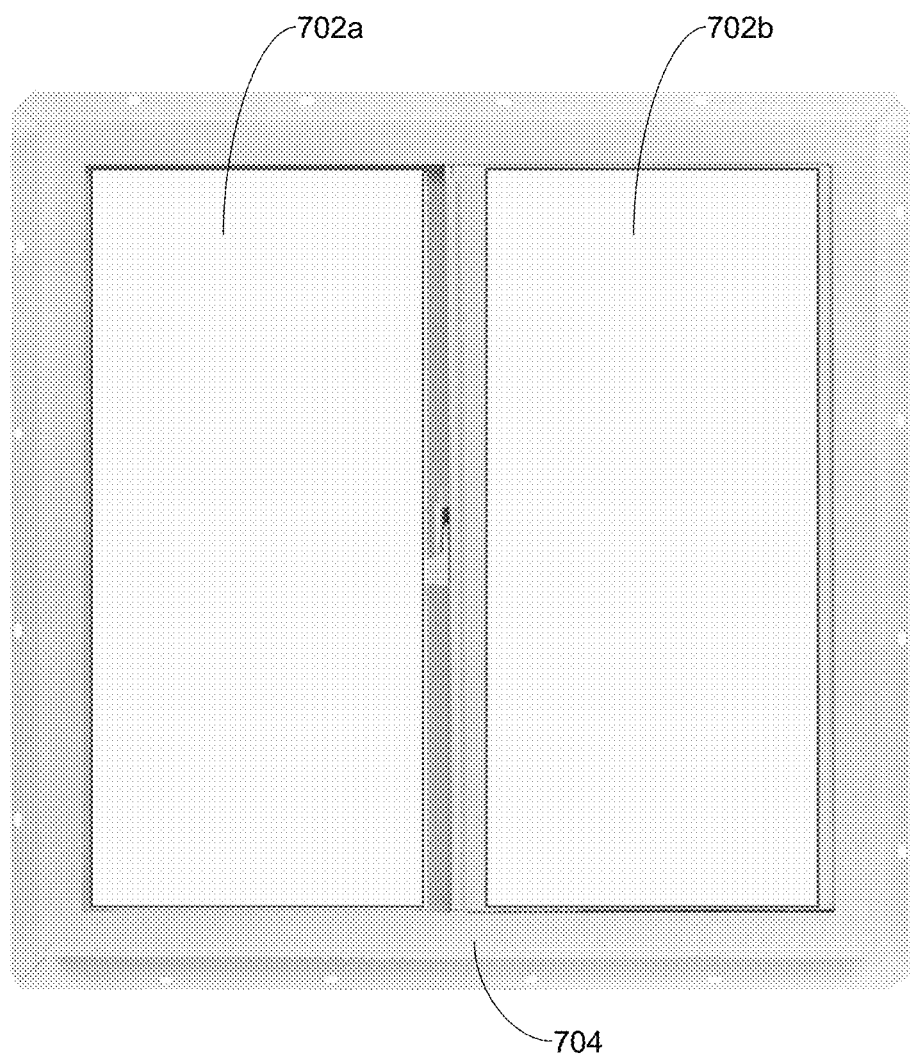
FIG. 7 is a schematic view of dynamic shades being provided in a window frame, in accordance with certain example embodiments.
Figure 8:
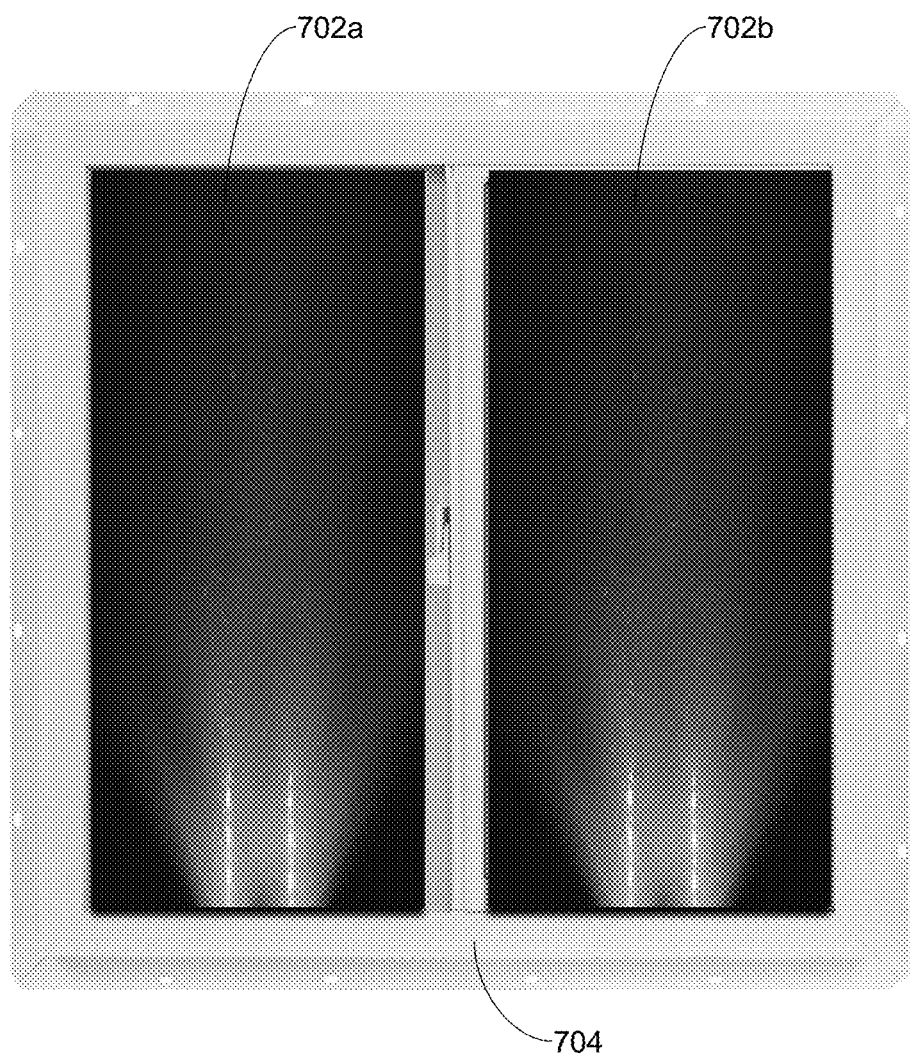
FIG. 8 is a schematic view of LED or other lighting elements being used to light extended dynamic shades from the FIG. 7 example, in accordance with certain example embodiments.

FIG. 7 is a schematic view of dynamic shades 702a-702b being provided in a window frame 704, in accordance with certain example embodiments. Within a portion of the frame 704 hidden from view, small LED or other lighting elements are provided. When actuated, the LED or other lighting elements provide an interesting aesthetic effect for the extended dynamic shades 702a-702b. In this regard, FIG. 8 is a schematic view of LED or other lighting elements being used to light extended dynamic shades 702a-702b from the FIG. 7 example, in accordance with certain example embodiments. In certain example embodiments, the LED or other lighting elements may be powered by and/or controlled with the circuitry used to power and/or control the dynamic shades 702a-702b. For instance, in certain example embodiments, small LED or other lighting elements can be attached to the stop bar or the inside glass surface.

In certain example embodiments, this approach may be used to enhance the blackout features of dynamic shades and/or to create a more interesting visual appearance. By lighting windows, it is possible to provide an aspect of privacy while still signaling that "someone is home" or "someone is in" by virtue of the lighted backdrop. As shown in FIG. 8, for example, small LED or other lighting elements may be used to "cast" a dim glow upward onto the surface of the shade that moves downwardly. From the inside, it may appear like a night light or an accent light. From the outside, it could provide soft white light. Lights could be controlled via the shade controller in certain example embodiments. Various use cases could be developed around when the lights are to be turned on or off, e.g., in connection with a programmable controller. For instance, the lights may be turned on "after dark" or after a business has closed for the day, when ambient light is above a threshold to prevent people from seeing into a building, when integrated with an office automation system indicating that a conference room is reserved and that privacy is desired, etc. In certain example embodiments, the one or more lighting elements may be activatable only when the polymer substrate is extending or has extended to the shutter closed position.

Although the FIG. 8 example shows point sources of light provided at one peripheral edge of the unit, it will be appreciated that different embodiments may include different arrangements. For instance, a diffuser may be provided to create a more diffuse (non-point source) visual impact, light sources may be provided around two or more edges, and/or the like. In this sense, a diffuser may be provided between the one or more lighting elements and a central area of the gap. As another example, in an IG unit that includes first and second sides that oppose one another, one or more lighting elements may be provided at a first side, whereas the shutter open position may be at the second side. In certain example embodiments, a plurality of lighting elements may be located at least at different peripheral edges of the IG unit.

The lights may receive power from an internal or external source such as, for example, a battery, dedicated power source, PV module, and/or the like. When external power sources are used, power may be delivered to the cavity interior using the example techniques disclosed herein. It will be appreciated that internal or external batteries may be rechargeable and may be used independently, in connection with PV modules or dedicated power sources as chargers, etc. PV modules may be internal to the IG unit in certain example embodiments.

Lighted dynamic shade applications may be useful for residential or commercial windows for interior and/or exterior applications, in vehicles (such as in sunroofs, side windows, front or rear windshields), in merchandizers, and/or the like. In certain example embodiments, lights may be provided without the dynamic shade.

Although certain example embodiments have been described as providing power to electrostatically powered dynamic shades and/or lights, it will be appreciated that a variety of different devices could be powered. This includes, for example, Internet-of-Things (IoT) enabled devices (such as, for example, light sensors, temperature sensors, cameras, etc.), displays integrated into IG units, dynamic switchable coatings (such as, for example, electrochromic, polymer dispersed liquid crystal (PDLC), polymer assembled liquid crystal, and/or other coatings), photovoltaic (PV) modules, and/or the like.

The IG units described herein may incorporate low-E coatings on any one or more of surfaces 1, 2, 3, and 4. As noted above, for example, such low-E coatings may serve as the conductive layers for shades. In other example embodiments, in addition to or apart from serving and conductive layers for shades, a low-E coating may be provided on another interior surface. For instance, a low-E coating may be provided on surface 2, and a shade may be provided with respect to surface 3. In another example, the location of the shade and the low-E coating may be reversed. In either case, a separate low-E coating may or may not be used to help operate the shade provided with respect to surface three. In certain example embodiments, the low-E coatings provided on surfaces 2 and 3 may be silver-based low-E coatings. Example low-E coatings are set forth in U.S. Pat. Nos. 9,802,860; 8,557,391; 7,998,320; 7,771,830; 7,198,851; 7,189,458; 7,056,588; and 6,887,575; the entire contents of each of which is hereby incorporated by reference. Low-E coatings based on ITO and/or the like may be used for interior surfaces and/or exterior surfaces. See, for example, U.S. Pat. Nos. 9,695,085 and 9,670,092; the entire contents of each of which is hereby incorporated by reference. These low-E coatings may be used in connection with certain example embodiments.

Antireflective coatings may be provided on major surfaces of the IG unit, as well. In certain example embodiments, an AR coating may be provided on each major surface on which a low-E coating and shade is not provided. Example AR coatings are described in, for example, U.S. Pat. Nos. 9,796,619 and 8,668,990 as well as U.S. Publication No. 2014/0272314; the entire contents of each of which is hereby incorporated by reference. See also U.S. Pat. No. 9,556,066, the entire contents of which is hereby incorporated by reference herein. These AR coatings may be used in connection with certain example embodiments.

The example embodiments described herein may be incorporated into a wide variety of applications including, for example, interior and exterior windows for commercial and/or residential application, skylights, doors, merchandizers such as refrigerators/freezers (e.g., for the doors and/or "walls" thereof), vehicle applications, etc.

Although certain example embodiments have been described in connection with IG units including two substrates, it will be appreciated that the techniques described herein may be applied with respect to so-called triple-IG units. In such units, first, second, and third substantially parallel spaced apart substrates are separated by first and second spacer systems, and shades may be provided adjacent to any one or more of the interior surfaces of the innermost and outermost substrates, and/or to one or both of the surfaces of the middle substrate.

Although certain example embodiments have been described as incorporating glass substrates (e.g., for use of the inner and outer panes of the IG units described herein), it will be appreciated that other example embodiments may incorporate a non-glass substrate for one or both of such panes. Plastics, composite materials, and/or the like may be used, for example. When glass substrates are used, such substrates may be heat treated (e.g., heat strengthened and/or thermally tempered), chemically tempered, left in the annealed state, etc. In certain example embodiments, the inner or outer substrate may be laminated to another substrate of the same or different material.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, an insulating glass (IG) unit is provided. First and second substrates are provided. A spacer is interposed between the first and second substrates, the spacer helping to maintain the first and second substrates in substantially parallel spaced apart relation to one another and to define a cavity therebetween, a first exterior surface of the spacer facing an interior surface of the first substrate, a second exterior surface of the spacer facing an interior surface of the second substrate, a third exterior surface of the spacer facing the cavity, and a fourth exterior surface of the spacer facing away from the cavity. A membrane is provided over at least a part of the fourth exterior surface of the spacer. A pin protrudes through holes in the third and fourth exterior surfaces of the spacer, and through the membrane, the pin being formed from an electrically conducting material. A structural seal for the IG unit is provided external to the spacer and at least partially surrounding a portion of the pin that protrudes through the membrane.

In addition to the features of the previous paragraph, in certain example embodiments, a conductive plate may be provided on the third exterior surface of the spacer, e.g., with the conductive plate being in electrical contact with the pin.

In addition to the features of the previous paragraph, in certain example embodiments, the pin may protrude through the conductive plate.

In addition to the features of either of the two previous paragraphs, in certain example embodiments, a head of the pin may contact the conductive plate on a side thereof adjacent the cavity.

In addition to the features of any of the four previous paragraphs, in certain example embodiments, the membrane may comprise a polyisobutylene (PIB) backed rubber member.

In addition to the features of any of the five previous paragraphs, in certain example embodiments, the membrane may comprise a two-part structure, e.g., with the first part acting as a gas seal for gas in the cavity of the IG unit and the second part acting as a septum and further sealing against the pin.

In addition to the features of any of the six previous paragraphs, in certain example embodiments, a plug may be provided over a portion of the pin protruding through and away from the spacer.

In addition to the features of any of the seven previous paragraphs, in certain example embodiments, the pin may provides a location for electrical contact with a connector to a power source external to the IG unit.

In addition to the features of the previous paragraph, in certain example embodiments, the connector may be a barrel connector attached to a wire, e.g., with the connector being located within the IG unit and at least partially surrounded by the structural seal.

In addition to the features of any of the nine previous paragraphs, in certain example embodiments, the spacer may be sealed to the first and second substrates with a sealant, and the membrane may comprise the same sealant as is used to seal the spacer to the first and second substrates.

In addition to the features of any of the 10 previous paragraphs, in certain example embodiments, portions of the pin that contact the spacer may be insulated so as to avoid electrical contact between the pin and the spacer.

In addition to the features of any of the 11 previous paragraphs, in certain example embodiments, an electronically-powered element may be located inside of the cavity, e.g., with the electronically-powered element being powerable from a power source external to the cavity through an electrical connection provided by the pin.

In addition to the features of the previous paragraph, in certain example embodiments, the electronically-powered element may be a light source, electrostatically-driven dynamic shade, Internet-of-Things device, and/or the like.

In certain example embodiments, a method of making an insulating glass (IG) unit is provided. The method comprises: having a spacer, the spacer including first, second, third, and fourth exterior surfaces; applying a membrane to the fourth exterior surface of the spacer; inserting a pin through the third and fourth exterior surfaces of the spacer, and through the membrane applied to the fourth exterior surface of the spacer, the pin including an electrically conductive material; sealing together first and second substrates with the spacer provided therebetween in making the IG unit, the first exterior surface of the spacer facing an inner surface of the first substrate, the second exterior surface of the spacer facing an inner surface of the second substrate, the third exterior surface of the spacer facing a cavity of the IG unit, and the fourth exterior surface of the spacer facing away from the cavity of the IG unit; and forming an outer structural seal for the IG unit using a structural sealant provided around an exterior of the spacer.

In addition to the features of the previous paragraph, in certain example embodiments, a conductive plate may be connected to the third exterior surface of the spacer, e.g., with the pin being in electrical contact with the conductive plate in the IG unit.

In addition to the features of the previous paragraph, in certain example embodiments, the pin may be inserted so as to protrude through the conductive plate.

In addition to the features of any of the three previous paragraphs, in certain example embodiments, the membrane may comprise a two-part structure, e.g., with the first part acting as a gas seal for gas in the cavity of the IG unit and the second part acting as a septum and further sealing against the pin.

In addition to the features of any of the four previous paragraphs, in certain example embodiments, a plug may be provided over a portion of the pin protruding through and away from the spacer.

In addition to the features of the previous paragraph, in certain example embodiments, the plug may be removed prior to or during formation of the outer structural seal.

In addition to the features of any of the six previous paragraphs, in certain example embodiments, an electronically-powered element may be provided so that, in the IG unit, the electrically-powered element is located inside of the cavity, e.g., with the electronically-powered element being powerable from a power source external to the cavity through an electrical connection provided by the pin.

In certain example embodiments, an insulating glass (IG) unit is provided. First and second substrates each have interior and exterior major surfaces, the interior major surface of the first substrate facing the interior major surface of the second substrate. A spacer system helps to maintain the first and second substrates in substantially parallel spaced apart relation to one another and to define a gap therebetween. One or more lighting elements is/are provided in the gap. A dynamically controllable shade is interposed between the first and second substrates, the shade including: a first conductive layer provided, directly or indirectly, on the interior major surface of the first substrate; and a shutter including at least one polymer substrate, first and second conductive coatings, and first and second dielectric layers. The at least one polymer substrate is extendible to a shutter closed position and retractable to a shutter open position. The first and/or second conductive coatings are electrically connectable to a power source that is controllable to set up an electric potential difference to create first electrostatic forces to drive the at least one polymer substrate to the shutter closed position.

In addition to the features of the previous paragraph, in certain example embodiments, the IG unit may have first and second sides that oppose one another, the one or more lighting elements being provided at the first side, the shutter open position being at the second side.

In addition to the features of either of the two previous paragraphs, in certain example embodiments, the one or more lighting elements may be activatable only when the polymer substrate is extending or has extended to the shutter closed position.

In addition to the features of any of the three previous paragraphs, in certain example embodiments, the one or more lighting elements and the dynamically controllable shade may share control circuitry.

In addition to the features of any of the four previous paragraphs, in certain example embodiments, the one or more lighting elements and the dynamically controllable shade may share a power source.

In addition to the features of the previous paragraph, in certain example embodiments, the power source may be external to the gap.

In addition to the features of any of the six previous paragraphs, in certain example embodiments, each of the one or more lighting elements may be an LED light.

In addition to the features of any of the seven previous paragraphs, in certain example embodiments, a diffuser may be provided between the one or more lighting elements and a central area of the gap.

In addition to the features of any of the eight previous paragraphs, in certain example embodiments, a plurality of lighting elements may be located at least at different peripheral edges of the IG unit.

In certain example embodiments, methods of making and/or using the IG unit according to any of the nine previous paragraphs is/are provided.

While the invention has been described in connection with what is presently considered to be the most practical and preferred embodiment, it is to be understood that the invention is not to be limited to the disclosed embodiment and/or deposition techniques, but on the contrary, is intended to cover various modifications and equivalent arrangements included within the spirit and scope of the appended claims.

What is claimed is:

1. An insulating glass (IG) unit, comprising:
   first and second substrates;
   a spacer interposed between the first and second substrates, the spacer helping to maintain the first and second substrates in substantially parallel spaced apart relation to one another and to define a cavity therebetween, a first exterior surface of the spacer facing an interior surface of the first substrate, a second exterior surface of the spacer facing an interior surface of the second substrate, a third exterior surface of the spacer facing the cavity, and a fourth exterior surface of the spacer facing away from the cavity;
   a membrane provided over at least a part of the fourth exterior surface of the spacer;
   a pin protruding through holes in the third and fourth exterior surfaces of the spacer, and through the membrane, the pin being formed from an electrically conducting material; and
   a structural seal for the IG unit provided external to the spacer and at least partially surrounding a portion of the pin that protrudes through the membrane.

2. The IG unit of claim 1, further comprising a conductive plate provided on the third exterior surface of the spacer, the conductive plate being in electrical contact with the pin.

3. The IG unit of claim 2, wherein the pin protrudes through the conductive plate.

4. The IG unit of claim 2, wherein a head of the pin contacts the conductive plate on a side thereof adjacent the cavity.

5. The IG unit of claim 1, wherein the membrane comprises a polyisobutylene (PIB) backed rubber member.

6. The IG unit of claim 1, wherein the membrane comprises a two-part structure, the first part acting as a gas seal for gas in the cavity of the IG unit and the second part acting as a septum and further sealing against the pin.

7. The IG unit of claim 1, further comprising a plug provided over a portion of the pin protruding through and away from the spacer.

8. The IG unit of claim 1, wherein the pin provides a location for electrical contact with a connector to a power source external to the IG unit.

9. The IG unit of claim 8, wherein the connector is a barrel connector attached to a wire, the connector being located within the IG unit and at least partially surrounded by the structural seal.

10. The IG unit of claim 1, wherein the spacer is sealed to the first and second substrates with a sealant, and wherein the membrane comprises the same sealant as is used to seal the spacer to the first and second substrates.

11. The IG unit of claim 1, wherein portions of the pin that contact the spacer are insulated so as to avoid electrical contact between the pin and the spacer.

12. The IG unit of claim 1, further comprising an electronically-powered element located inside of the cavity, the electronically-powered element being powerable from a power source external to the cavity through an electrical connection provided by the pin.

13. The IG unit of claim 12, wherein the electronically-powered element is a light source.

14. The IG unit of claim 12, wherein the electronically-powered element is an electrostatically-driven dynamic shade.

15. The IG unit of claim 12, wherein the electronically-powered element is an Internet-of-Things device.

16. A method of making an insulating glass (IG) unit, the method comprising:
    having a spacer, the spacer including first, second, third, and fourth exterior surfaces;
    applying a membrane to the fourth exterior surface of the spacer;
    inserting a pin through the third and fourth exterior surfaces of the spacer, and through the membrane applied to the fourth exterior surface of the spacer, the pin including an electrically conductive material;
    sealing together first and second substrates with the spacer provided therebetween in making the IG unit, the first exterior surface of the spacer facing an inner surface of the first substrate, the second exterior surface of the spacer facing an inner surface of the second substrate, the third exterior surface of the spacer facing a cavity of the IG unit, and the fourth exterior surface of the spacer facing away from the cavity of the IG unit; and
    forming an outer structural seal for the IG unit using a structural sealant provided around an exterior of the spacer.

17. The method of claim 16, further comprising connecting a conductive plate to the third exterior surface of the spacer, wherein the pin is in electrical contact with the conductive plate in the IG unit.

18. The method of claim 17, wherein the pin is inserted so as to protrude through the conductive plate.

19. The method of claim 16, wherein the membrane comprises a two-part structure, the first part acting as a gas seal for gas in the cavity of the IG unit and the second part acting as a septum and further sealing against the pin.

20. The method of claim 16, further comprising providing a plug over a portion of the pin protruding through and away from the spacer.

21. The method of claim 20, wherein the plug is removed prior to or during formation of the outer structural seal.

22. The method of claim 16, further comprising providing an electronically-powered element so that, in the IG unit, the electronically-powered element is located inside of the cavity, the electronically-powered element being powerable from a power source external to the cavity through an electrical connection provided by the pin.

23. The IG unit of claim 1, further comprising:
    one or more lighting elements provided in the cavity; gap; and
    a dynamically controllable shade interposed between the first and second substrates, the shade including:
      a first conductive layer provided, directly or indirectly, on the interior surface of the first substrate; and
      a shutter including at least one polymer substrate, first and second conductive coatings, and first and second dielectric layers, wherein the at least one polymer substrate is extendible to a shutter closed position and retractable to a shutter open position;
    wherein the first and/or second conductive coatings are electrically connectable, via the pin, to a power source that is controllable to set up an electric potential difference to create first electrostatic forces to drive the at least one polymer substrate to the shutter closed position.

24. The IG unit of claim 23, having first and second sides that oppose one another, the one or more lighting elements being provided at the first side, the shutter open position being at the second side.

25. The IG unit of claim 23, wherein the one or more lighting elements are activatable only when the polymer substrate is extending or has extended to the shutter closed position.

26. The IG unit of claim 23, wherein the one or more lighting elements and the dynamically controllable shade share control circuitry.

27. The IG unit of claim 23, wherein the one or more lighting elements and the dynamically controllable shade share a power source.

28. The IG unit of claim 27, wherein the power source is external to the cavity.

29. The IG unit of claim 23, wherein each of the one or more lighting elements is an LED light.

30. The IG unit of claim 23, further comprising a diffuser provided between the one or more lighting elements and a central area of the cavity.

31. The IG unit of claim 23, further comprising a plurality of lighting elements located at least at different peripheral edges of the IG unit.

32. A method of making an insulating glass (IG) unit, the method comprising:

having a spacer, the spacer including first, second, third, and fourth exterior surfaces;

applying a membrane to the fourth exterior surface of the spacer;

inserting a pin through the third and fourth exterior surfaces of the spacer, and through the membrane applied to the fourth exterior surface of the spacer, the pin including an electrically conductive material;

sealing together first and second substrates with the spacer, one or more lighting elements, and a dynamically controllable shade, provided therebetween in making the IG unit, the first exterior surface of the spacer facing an inner surface of the first substrate, the second exterior surface of the spacer facing an inner surface of the second substrate, the third exterior surface of the spacer facing a cavity of the IG unit, and the fourth exterior surface of the spacer facing away from the cavity of the IG unit; and forming an outer structural seal for the IG unit using a structural sealant provided around an exterior of the spacer, wherein the dynamically controllable shade includes
a first conductive layer provided, directly or indirectly, on the inner surface of the first substrate; and
a shutter including at least one polymer substrate, first and second conductive coatings, and first and second dielectric layers, wherein the at least one polymer substrate is extendible to a shutter closed position and retractable to a shutter open position;

wherein the first and/or second conductive coatings are electrically connectable, via the pin, to a power source that is controllable to set up an electric potential difference to create first electrostatic forces to drive the at least one polymer substrate to the shutter closed position.

33. A method of operating an insulating glass (IG) unit, the method comprising:

having the IG unit made according to claim 32; and activating the one or more lighting elements when the polymer substrate is extending or has extended to the shutter closed position.

* * * * *